United States Patent [19]

Schafter et al.

[11] 4,327,366
[45] Apr. 27, 1982

[54] FLEXIBLE LOW FRICTION PLATEN COVER FOR RECORDING APPARATUS

[75] Inventors: William Schafter, Corvallis; Terrag W. Bradley, Monroe, both of Oreg.

[73] Assignee: Hewlett-Packard Company, Palo Alto, Calif.

[21] Appl. No.: 114,937

[22] Filed: Jan. 24, 1980

[51] Int. Cl.³ .................... G01D 15/10; G01D 15/34; B41J 3/20; B41J 11/08
[52] U.S. Cl. ........................... 346/76 PH; 346/136; 400/120; 400/656
[58] Field of Search .................. 346/76 PH, 32, 105, 346/139 B, 120, 544, 136; 400/656, 657, 662

[56] References Cited

U.S. PATENT DOCUMENTS

| | | | |
|---|---|---|---|
| 1,735,870 | 11/1929 | Kurowski | 400/544 |
| 2,835,549 | 5/1958 | Murdoch et al. | 346/32 |
| 3,149,902 | 9/1964 | Dransfield | 346/105 |
| 3,673,604 | 6/1972 | Gordon | 346/139 B |
| 4,134,696 | 1/1979 | Hanakata et al. | 346/76 PH X |

*Primary Examiner*—George H. Miller, Jr.
*Attorney, Agent, or Firm*—Edward L. Miller; Douglas A. Kundrat

[57] ABSTRACT

A thermal printer employs a soft platen to enhance the quality of the printed results. The increased friction between the paper and the soft platen is overcome by interposing between the platen and the paper a flexible platen cover of Teflon<sup>R</sup> impregnated fiber glass fabric. The cover serves as a low friction barrier and also aids automatic loading of paper by funneling the advancing edge of the paper past obstructions in the paper path.

6 Claims, 3 Drawing Figures

FLEXIBLE LOW FRICTION PLATEN COVER FOR RECORDING APPARATUS

BACKGROUND AND SUMMARY OF THE INVENTION

This invention relates to improvements in those recording apparatuses where a recording medium such as paper is supported by a platen for contact with a recording element such as an electrostatic or thermal printhead. The invention is particularly well suited for use with moving head printers having "soft" platens rather than "hard" platens.

Hard platens are rigid and do not deform under the pressure of contact with the printhead. They are generally made of a nonpliable plastic, or of metal. Any irregularity in a hard platen will lessen the degree of contact between the printhead and the recording medium, resulting in a decrease in the quality of the printed result.

Although hard platens are often satisfactory, it has been found that moving head printers, and particularly thermal moving head printers, can often produce a result of significantly improved quality if a soft platen is used. A soft platen is a strip of resilient and pliable material, such as silicone rubber, supported upon a rigid member. However, a concomitant disadvantage has been that soft platens exhibit a high degree of friction with the recording medium, making it more difficult to advance the paper once a line has been printed. A common solution to this problem of increased friction has been to release the pressure between the platen and the printhead during paper advance. However, this complicates the mechanism, reduces reliability, and increases power requirements.

An additional concern in the design of a recording apparatus that automatically loads its recording medium is the integrity of the path for the recording medium. Particularly in printers, the path is apt to have severe bends, and the platen itself may act as an obstruction upon which the paper may snag during loading.

Accordingly, a principal object of the present invention is to provide a way to employ a soft platen in a recording apparatus without incurring increased friction between the platen and the recording medium.

Another object of the invention is to provide a long lasting low friction barrier suitable for use with a soft platen.

A further object of the invention is to provide a means of overcoming obstructions in the paper path of recording apparatuses.

These objects of the invention are met in a recording apparatus that incorporates a flexible low friction platen cover that overlaps the platen in a direction the same as the direction in which the recording medium is advanced. In a preferred embodiment for a moving head thermal printer having a soft platen the flexible platen cover is a sheet of Teflon ® impregnated cloth woven of glass fibers. The sheet is attached to the frame at a location along the paper path preceeding the platen, but not directly in the path. The sheet is draped over the platen and overlaps it. The sheet thus serves both to funnel an advancing edge of the paper (during loading) past the platen, as well as to reduce friction between the soft platen and the paper. Because of the flexible nature of a Teflon ® impregnated woven glass fabric the superior printing characteristics of a soft platen are retained. Because of the lubricating effect of the Teflon ®, the friction is greatly reduced, while at the same time the hardness and wear resistance of the glass gives the platen cover long life.

DESCRIPTION OF THE PREFERRED EMBODIMENT

Figure 1:
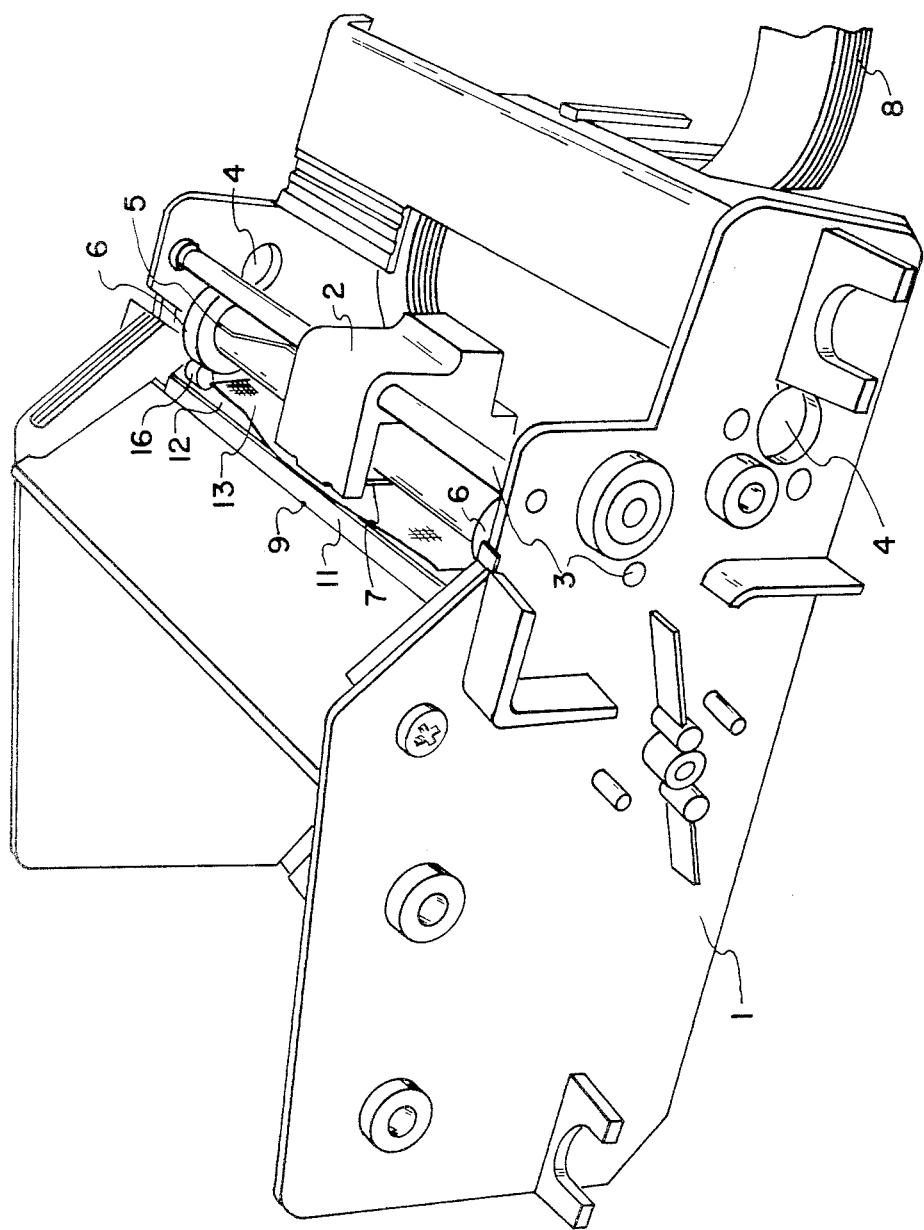
FIG. 1 is a front perspective view of a portion of a moving head thermal printer mechanism constructed in accordance with a preferred embodiment of the invention.

FIG. 1 shows a portion of a moving head thermal printer mechanism. A frame 1 supports two cross slides 3 which in turn support a printhead carrier 2 for transverse motion therealong. This motion is provided by a linkage rod (not shown) actuated by a drive means (not shown). The linkage rod is parallel to the cross slides 3 and passes through a hole 4 in the frame 1 and to engage the printhead carrier 2. The printhead carrier 2 normally rests at the right-hand end of the cross slides 3, as viewed in FIG. 1. Printing occurs as the printhead carrier 2 is moved to the left. As the printhead carrier 2 is returned to the right-hand edge it engages a spiral spline 5 which then rotates to impart through a ratchet a rotary motion to a pair of drive rollers 6 biased against a pair of pinch rollers 16. That causes the paper (not shown) to advance.

The printhead carrier 2 supports a printhead 7 for sliding motion along the paper which is in turn supported by a platen assembly 9. As discussed in connection with FIG. 2, the platen itself is spring biased against the sliding printhead. Flexible conductors 8 connect the printhead 7 to the circuitry that drives the print elements in the head.

In FIG. 1 the printer mechanism is shown without paper and without a cover window so that the location and details of the platen assembly 9 may be better depicted. A rigid platen support 11 supports a soft platen 12. Covering the soft platen 12 and the platen support 11 is the flexible platen cover 13. It interposes between the printhead 7 and the soft platen 12. As depicted in FIG. 1 the printhead carrier 2 is in the middle of the cross slides 3, allowing the flexible platen cover 13, which in the present embodiment is a sheet of Teflon ® impregnated fiber glass cloth, to fall slightly away from the platen except where held against it by the printhead. In this way a portion of the soft platen 12 can be observed. Normally, however, the presence of paper in the mechanism would keep the platen cover 13 in contact with the soft platen 12.

Figure 2:
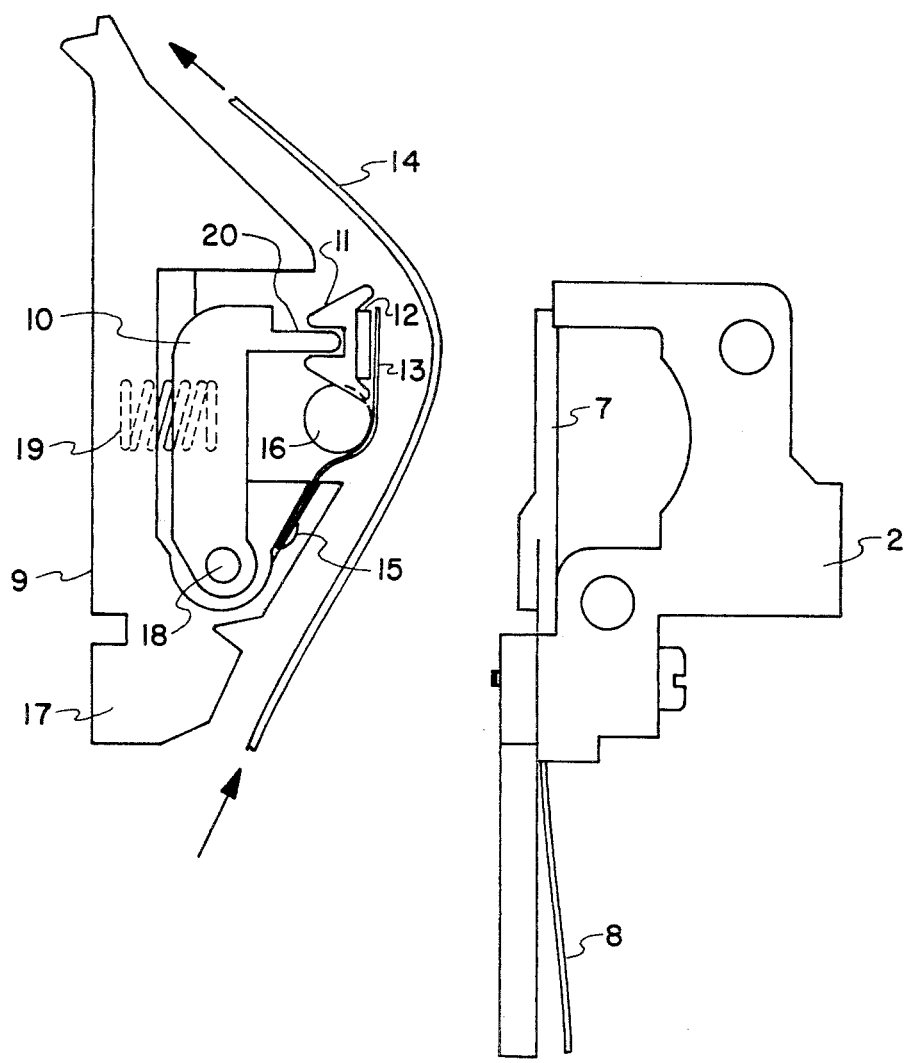
FIG. 2 is an end view of the platen and printhead assemblies of the printer of FIG. 1, showing the location of the flexible platen cover in operation, and showing a portion of the paper path through the printer.

FIG. 2 is an end view of the platen assembly 9 shown positioned relative to the printhead carrier 2 and the printhead 7. Also shown is the printer paper 14 and its path. A platen pusher 10 is attached by a pivot 18 to a platen frame 17. The platen support 11 is an aluminum extrusion and includes a groove which engages a projection 20 on the platen pusher 10. The platen support can rock to a limited degree about the projection 20, allowing it to align itself with the plane of the printhead 7. Attached to the platen support 11 is the soft platen 12, which in the present embodiment is a 1/32 inch thick strip of 50 Shore A durometer silicone rubber bonded to the extruded aluminum platen support 11 with a self-leveling RTV adhesive.

A pair of springs 19 bias the platen pusher 10 away from the platen frame 17. This urges the soft platen 12 in the direction of the printhead 7.

Figure 3:
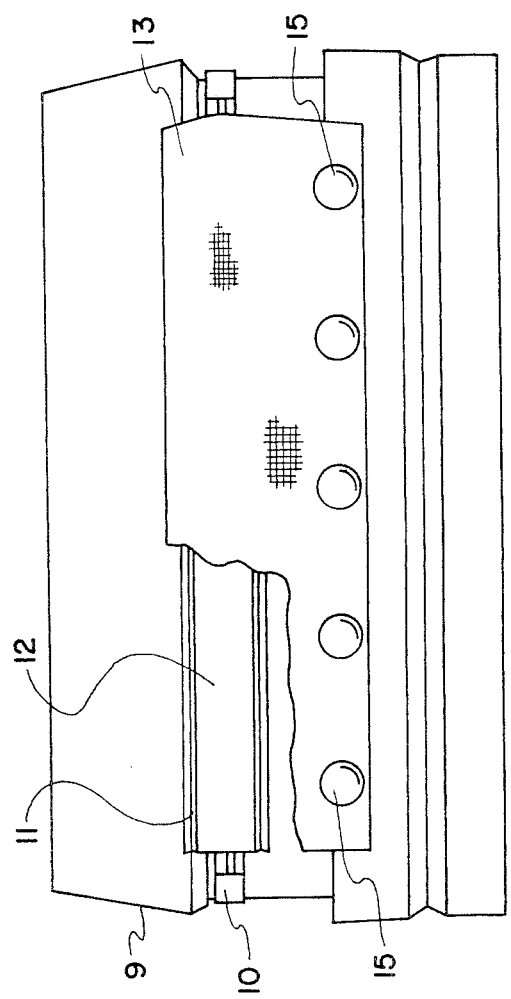
FIG. 3 is a front perspective view of the platen assembly of FIG. 2, with a portion of the flexible platen cover cut away to show the soft platen.

Referring now to FIG. 3 in addition to FIG. 2, a platen cover 13 is attached to the platen frame 17 by fasteners 15. Any convenient means may be used. In the present embodiment the platen cover 13 is attached by heat staking; that is, platen frame 17 is of plastic and has a number of stake-like projections 15 molded onto it. The platen cover is cut to size and punched with holes to match the stakes 15, placed over the stakes, and permanently attached by heating and flattening the tops of the stakes. In FIG. 3 a portion of the platen cover 13 has been cut away to reveal the platen support 11 and soft platen 12.

In the present embodiment the platen cover is a 0.003 inch thick piece of fiber glass fabric impregnated with Teflon ®. Thicknesses from 0.001 inch to 0.0035 inch have been found effective. The fiber glass fabric used has a weave of 60×47 per inch, with a glass style of 108 (an industry standard discussed below). A Teflon ® impregnated fiber glass fabric of this type is available from the Connecticut Hard Rubber Co., 407 East Street, New Haven, Conn., under the designation "TEMP-R-GLAS ® 3TA".

A description of glass style 108, which is an industry standard, may be found with reference to the following Military Specification, entitled "YARN, CORD, SLEEVING, CLOTH AND TAPE-GLASS": MIL-Y-1140H. Style 108 is therein described in Table VII of the section concerning form 4 class C continuous filament cloth.

No specific orientation of the warp and the woof of the fabric need be observed when cutting the platen cover from a large sheet of Teflon ® impregnated fabric. The fiber glass fabric is flexible enough not to interfere with the pliable and resilient soft platen 12. The Teflon ® provides lubrication to make the platen cover 12 serve as a low friction barrier, thus obviating the need for a lift mechanism during paper advance. At the same time, the glass provides strength and long-wearing characteristics.

Two things are achieved by attaching the platen cover in the location shown in FIGS. 2 and 3. First, the location requires no sharp bends in the glass fabric in order to cover the soft platen 12. A bend would stiffen the fabric in its immediate vicinity, and counteract the benefits of the soft platen. Second, the location is well out of the paper path, so that it does not generate an obstruction. However, once an advancing edge of the printer paper is abreast of the platen cover the paper is then guided by the platen cover past the lip of the platen support 11 and the soft platen 12. The platen cover 13 and the printhead 7 form a "funnel" ensuring that the advancing paper will not become entangled in that portion of the printer mechanism.

What is claimed is:

1. In a moving head recording apparatus of the type wherein a recording medium is advanced between a moving head and a platen having a pliable and resilient layer that deforms at the location of contact of the moving head upon the recording medium, the improvement comprising a deformable sheet of low friction material interposed between the platen and the recording medium, the deformable sheet deforming at the location of contact of the moving head and the recording medium to conform with the deformation thereat in the platen.

2. An improvement as in claim 1 wherein the sheet of low friction material comprises a glass fiber cloth fluoronated with a fluronated ethylene propylene resin.

3. An improvement as in claim 1 wherein the moving head recording apparatus comprises a thermal printer.

4. A platen assembly for a recording apparatus having an advanceable recording medium in contact with a recording head, the assembly comprising:
  a platen, having a pliable and resilient layer that deforms at the location of contact of the recording head and the advanceable recording medium, for supporting the advanceable recording medium;
  frame means for supporting the platen; and
  a deformable sheet of low friction material attached to the frame means and overlapping the platen, the deformable sheet deforming at the location of contact of the recording head and the advanceable recording medium to conform with the deformation thereat in the platen.

5. A platen assembly as in claim 4 wherein the sheet of low friction material comprises a glass fiber cloth fluoronated with a fluronated ethylene propylene resin.

6. A method of circumventing an obstruction in the path of a recording medium advancing between a platen and a recording head comprising the step of guiding an edge of the advancing recording medium between the platen and the recording head with a sheet of low friction material that covers the obstruction and overlaps the platen from a direction the same as that from which the recording medium advances and that is anchored at a location not in the path of the recording medium.

* * * * *

UNITED STATES PATENT AND TRADEMARK OFFICE
CERTIFICATE OF CORRECTION

PATENT NO. : 4,327,366
DATED : April 27, 1982
INVENTOR(S) : William Schafer and Terrag W. Bradley It is certified that error appears in the above—identified patent and that said Letters Patent is hereby corrected as shown below:

On the title page, item [75], "William Schafter" should be --William Schafer--;

Column 3, line 30, "108" should be in regular type, not bold face type, as it is not a reference numeral pertaining to the drawings;

Column 4, line 23, "fluoronated" (first occurrence) should be --impregnated--;

Column 4, line 23, "fluronated" (second occurrence) should be --fluoronated--;

Column 4, line 42, "fluoronated" (first occurrence) should be --impregnated--;

Column 4, line 42, "fluronated" (second occurrence) should be --fluoronated--.

Signed and Sealed this

Twenty-fourth Day of August 1982

|SEAL|

Attest:

GERALD J. MOSSINGHOFF

Attesting Officer    Commissioner of Patents and Trademarks